May 13, 1930.　　　　J. E. BROWN　　　　1,758,028
ICE CREAM DISPENSER
Filed Dec. 20, 1928　　　2 Sheets-Sheet 1
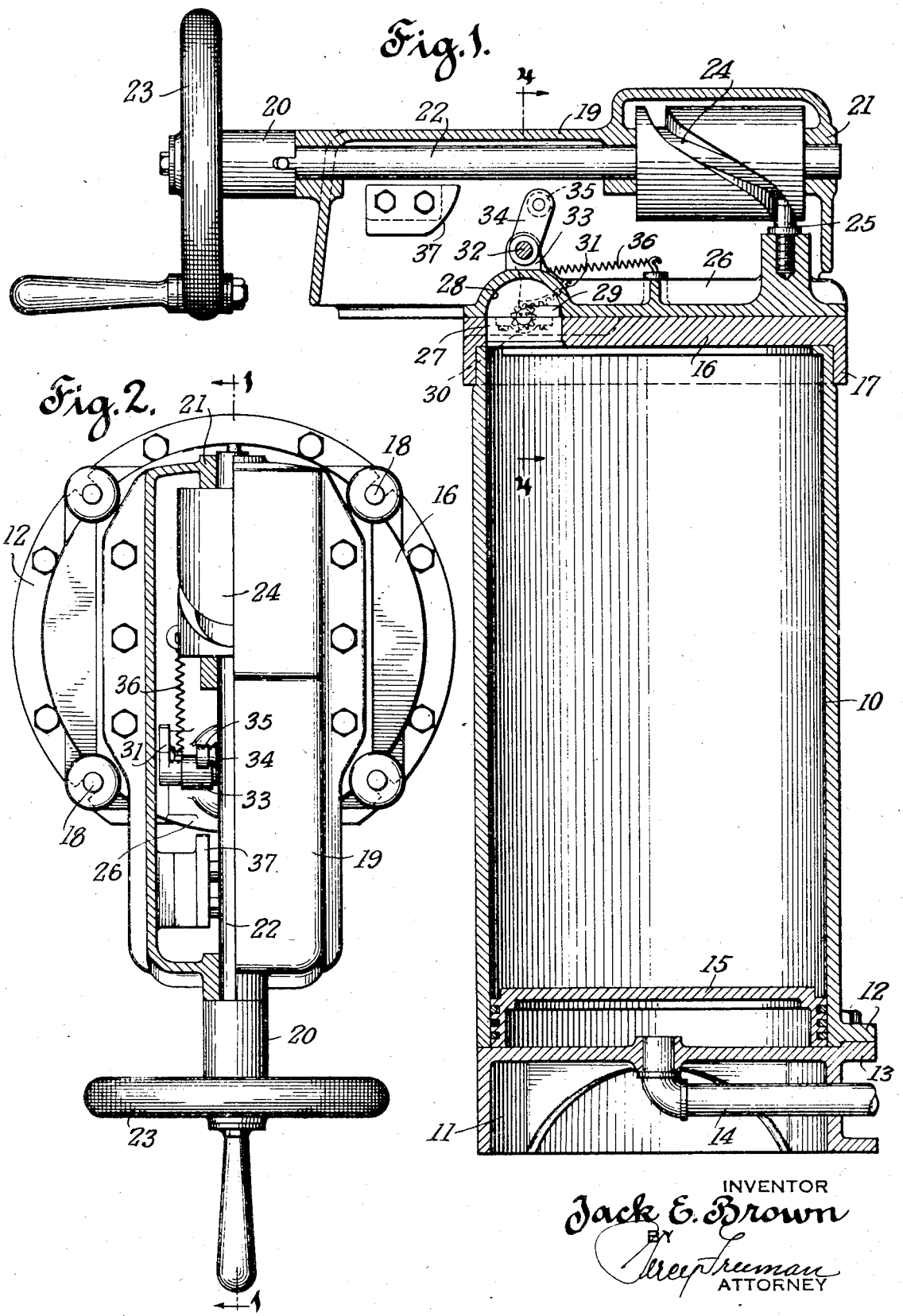
INVENTOR
Jack E. Brown
BY
ATTORNEY

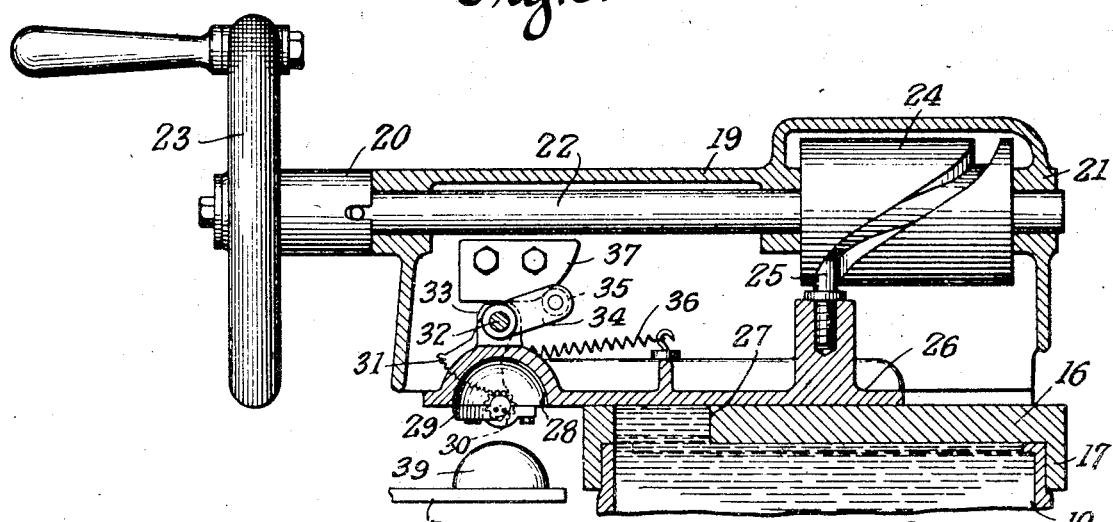
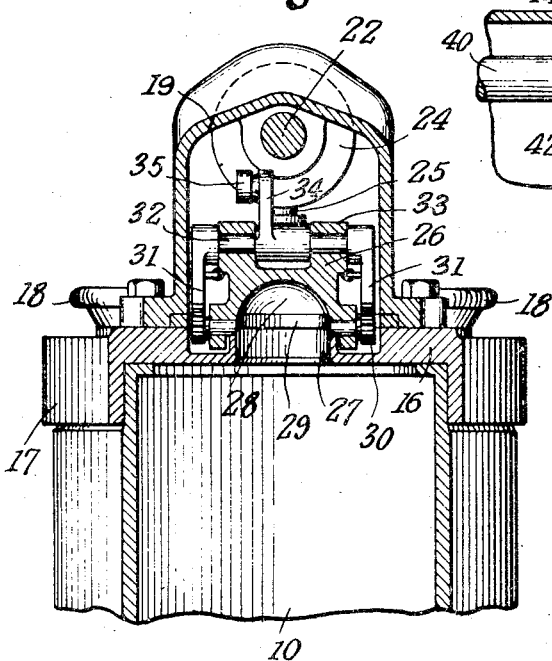
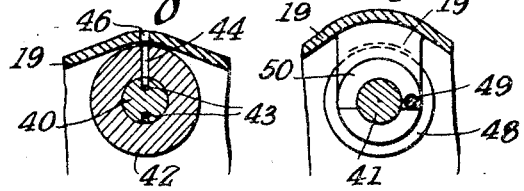

Patented May 13, 1930

1,758,028

UNITED STATES PATENT OFFICE

JACK E. BROWN, OF BROOKLYN, NEW YORK

ICE-CREAM DISPENSER

Application filed December 20, 1928. Serial No. 327,304.

This invention relates to dispensing apparatus in which a predetermined quantity of plastic material may be delivered from a container in a rapid and effective and sanitary manner.

The primary object of the apparatus is in the provision of means for dispensing such articles as ice cream, butter and like commodities in forms convenient for use, by one complete rotation of a hand wheel.

Heretofore, in dispensing ice cream, it has been the common practice to use a hand scoop which is dipped into the ice cream can each time a portion is desired. Such scoops are unsightly and unsanitary, collecting considerable dust and also causing much wastage of the ice cream. There is also further wastage occasioned by the fact that the ice cream container must be opened each time the scoop is entered, thus allowing the cold to be dissipated and requiring a greater amount of freezing or ice, in order to maintain the cream at the proper consistency.

It is therefore one of the objects of this invention to avoid the difficulties heretofore enumerated by providing an apparatus which is sanitary and economical in operation, requiring less expenditure of energy to produce and retain the cold necessary to maintain the ice cream at the required temperature.

A further feature resides in the provision of a compact, neat appearing apparatus.

Another object is to produce a machine not easily liable to disarrangement and which can be manufactured at a moderate expense.

These and other like objects are accomplished by the novel construction and combination of parts as hereinafter described and shown in the accompanying drawings, and in which:—

Fig. 1, is a vertical sectional view taken through an apparatus made in accordance with the invention, the device being in its normal position ready for operation.

Fig. 2, is a top plan view of the same, parts being broken away to show the construction.

Fig. 3, is a view similar to Fig. 1, but showing the parts in delivery position.

Fig. 4, is a sectional view taken on line 4—4 of Fig. 1.

Fig. 5, is a fragmentary sectional view showing a modified, coin actuated drive.

Fig. 6, is a sectional view taken on line 6—6 of Fig. 5.

Fig. 7, is a similar sectional view taken on line 7—7 of Fig. 5.

The device consists of a cylindrical tank 10 resting on a hollow base 11 to which it is firmly secured by bolts passing through mating flanges 12 and 13 on the tank and base respectively.

Entering the side of the base 11 is a tube 14 leading from a source of compresed air and provided with a combined inlet and relief valve (not shown), the upturned end of the tube projecting through the center of the closed top of the base 11 to impinge upon the under side of a piston 15 movable in the tank 10 and provided with packings in its periphery to prevent the leakage of air into the upper portion of the tank which is adapted to contain the substance to be dispensed.

The tank is provided with a cover 16 having a downwardly extending peripheral flange 17 and is secured to the upper end of the cylinder by wing bolts 18 in a manner to permit ready removal; bolted on the cover 16 is a casing 19, generally an elongated parallel housing provided with bearings 20 and 21 at its respective ends in which is mounted a shaft 22 actuated by a hand wheel 23.

A cam 24 is fixed on the shaft 22 and engaged in the groove of the cam is a stud 25 set in a slider 26 movable on the cover 16 and guided by the base of the casing 19, the arrangement being such as to cause the slider to move reciprocatively at each full turn of the hand wheel 23.

The cover 16 contains a round opening 27 and registerable therewith is a semi-globular cavity 28 constituting a cup formed in the slider 26.

Journalled transversely in the slider, at the axis of the cup are the trunnions of a scoop 29 adapted to scrape the interior of the cup, these trunnions having pinions 30 fixed on their outer ends.

Engaging the pinions are segments 31 fixed on a pin 32 rotatably mounted in lugs 33 extending from the wall of the cup 28 into the casing 19 and fixed on the pin 32 is an arm 34 carrying a roll 35.

The scraper 29 is normally held at the lower edge of the cup by a tension spring 36 which also retains the arm 34 substantially erect and in position to cause the roll 35 to engage a plate cam 37 fixed to the interior of the casing 19 in such position as to oscillate the arm and cause the scraper to move over the interior surface of the cup, releasing its contents, as the slider is moved outwardly, to drop upon a receiver, as at 38, (see Fig. 3), in the form of a hemisphere 39.

In the modification shown in Figs. 5, 6 and 7, the drive shaft 22 is replaced by another having sections 40 and 41, the hand-wheel 23 being on the front section and the cam 24 on the rear section.

The forward end of the rear section is enlarged as at 42 and provided with a socket receptive of the rear end of the shaft section 40 to freely rotate therein and contains two opposed arcuate recesses 43 registerable with a single narrow recess 44 adapted to receive a coin 45 entered through a slot 46 in the top of the casing 19.

The recess 44 is normally held in register with the slot 46 by a tension spring 47, one end being fixed in the casing and the other to a collar 48 at the end of the cam 24, the collar having a pin 49 operable in a recess 50 in the side of the adjacent bracket 19', the pin acting as a stop, limiting the extent of rotation that can be imparted to the cam 24.

In operation the piston 15 having been pressed down to the bottom of the tank during the release of air from the pipe 14, the commodity to be dispensed is filled into the tank and the cover 16, with its attachments, secured thereover.

Thereupon compressed air being admitted through the pipe 14, the piston 15 is forced upwardly, pressing the contents against the cover and through the opening 27 into the inverted cup 28, at that time disposed directly over the opening.

Upon turning the hand-wheel the cam will rotate, causing the slider to advance, discharge its contents and recede into a receptive position.

The compressed air remains open to the piston and it will be apparent that equal amounts of the material will be dispensed as rapidly as the shaft is rotated.

The same effects are attained in the modified form of apparatus except that it is arranged to receive a pre-payment coin and that the hand-wheel is given a half turn only, returning to its initial position, at which time the coin 45 will drop into the space within the casing.

The foregoing disclosure is to be regarded as descriptive and illustrative only, and not as restrictive or limitative of the invention, of which obviously an embodiment may be constructed including many modifications without departing from the general scope herein indicated and denoted in the appended claims.

Having thus described my invention, what I claim as new and desire to secure by Letters Patent, is:—

1. An apparatus for dispensing plastic substances in equal quantities comprising a tank having a piston provided with pressure applying means, a cover removably engaged on said tank, said cover containing an opening, a casing on said cover, a slider having an inverted dispensing cup movable in said casing, and means in said casing to move the cup reciprocatively from over the cover opening to a point beyond said tank.

2. An apparatus for dispensing plastic substances in equal quantities comprising a tank having a piston provided with pressure applying means, a cover removably engaged on said tank, said cover containing an opening, a casing on said cover, a slider having an inverted dispensing cup registerable with said cover opening, a cam in said casing, operable connections between said cam and slider, and means for manually rotating said cam to move the cup outwardly from the cover opening.

3. An apparatus for dispensing plastics comprising a tank having a piston under constant pressure towards one end, an apertured cover removably engaged on the open end of said tank, a cup carrying slider movable reciprocatively over the cover, manual means to actuate the slider, and automatic means for discharging the contents of the cup when beyond the confines of said tank.

4. An apparatus for dispensing plastics comprising a tank having a piston under constant pressure towards one end, said end being open, a cover on the open end having an opening, a casing thereover, a manually operable shaft journalled in said casing, a cam on said shaft, a slider actuated by the cam, a dispensing cup on said slider movable over the cover opening in one position to a point outside the tank in another position, a scraper for said cup, and means in said casing to actuate said scraper when in its outer position.

5. An apparatus for dispensing plastic material, comprising a base, a cylindrical tank mounted thereon, a piston movable in said tank, controllable means for actuating said piston, a head fixed on said cylinder, said head having an opening leading to the interior of said tank, a slide movable transversely of said head, a hand actuated shaft, a cam engageable with said shaft to move said slide, a mould formed in said slide normally registering with the opening through said head, means for scraping the interior of said mould when said slide is moved outwardly to dispense a substance from said mould, and means for detachably engaging said cam to said shaft.

Signed at New York city, in the county and State of New York, this 11 day of December, 1928.

JACK E. BROWN.